United States Patent [19]

Haddox

[11] Patent Number: 4,505,152

[45] Date of Patent: Mar. 19, 1985

[54] METHOD AND APPARATUS FOR MEASURING ENGINE COMPRESSION RATIO

[75] Inventor: Mark L. Haddox, Ann Arbor, Mich.

[73] Assignee: Jodon Engineering Associates, Inc., Ann Arbor, Mich.

[21] Appl. No.: 416,852

[22] Filed: Sep. 13, 1982

[51] Int. Cl.³ .......................................... G01M 15/00
[52] U.S. Cl. ..................................... 73/117.2; 73/115
[58] Field of Search ................... 73/117.3, 117.2, 115, 73/116; 364/551

[56] References Cited

U.S. PATENT DOCUMENTS

| | | | |
|---|---|---|---|
| 2,202,220 | 5/1940 | Miller . | |
| 2,427,370 | 9/1947 | Schweitzer | 73/116 |
| 2,735,296 | 2/1956 | Traver | 73/116 |
| 2,800,014 | 7/1957 | Welch et al. | 73/116 |
| 3,495,451 | 2/1970 | Verhoef | 73/117.3 |
| 3,964,301 | 6/1976 | Hanson et al. | 73/116 |
| 4,036,049 | 7/1977 | Hanson | 73/116 |
| 4,228,679 | 10/1980 | Alt et al. | 73/117.3 |
| 4,325,128 | 4/1982 | Abnett et al. | 364/511 |
| 4,331,029 | 5/1982 | Wilson | 73/117.3 |

OTHER PUBLICATIONS

Weinert, "Pneumatic and Sonic Measurement of Combustion-Chamber Volume", SAE Transactions, vol. 64, pp. 50–58, (1956).

Lancaster et al., "Measurement and Analysis of Engine Pressure Data", SAE Paper No. 750026 (1975).

Taylor, The Internal-Combustion Engine in Theory and Practice, M.I.T. Press, vol. I (2nd Ed., 1966), pp. 26–27 and 216–217, and vol. II (1968) pp. 104–105 and 156–157.

Primary Examiner—Jerry W. Myracle
Attorney, Agent, or Firm—Barnes, Kisselle, Raisch, Choate, Whittemore & Hulbert

[57] ABSTRACT

A method and apparatus for measuring compression ratio and/or clearance volume in an internal combustion engine cylinder wherein the crankshaft angle associated with piston top dead center position is obtained and cylinder pressure is measured at a number of incrementally spaced piston positions, including the TDC position. Changes in cylinder volume between the incrementally spaced piston positions are determined from nominal engine design parameters. These multiple pressure and volume figures are then employed in a programmed microprocessor to determine the constants $\gamma$ and k in the polytropic equation for relating cylinder pressure to volume $PV^\gamma = k$. Clearance volume $V_{TDC}$ is then determined using the constants $\gamma$ and k and the measured pressure at TDC. Compression ratio is then determined by the fraction $(V_{DP}+V_{TDC})/V_{TDC}$, where $V_{DP}$ is total piston displacement volume obtained from nominal engine design parameters.

19 Claims, 6 Drawing Figures

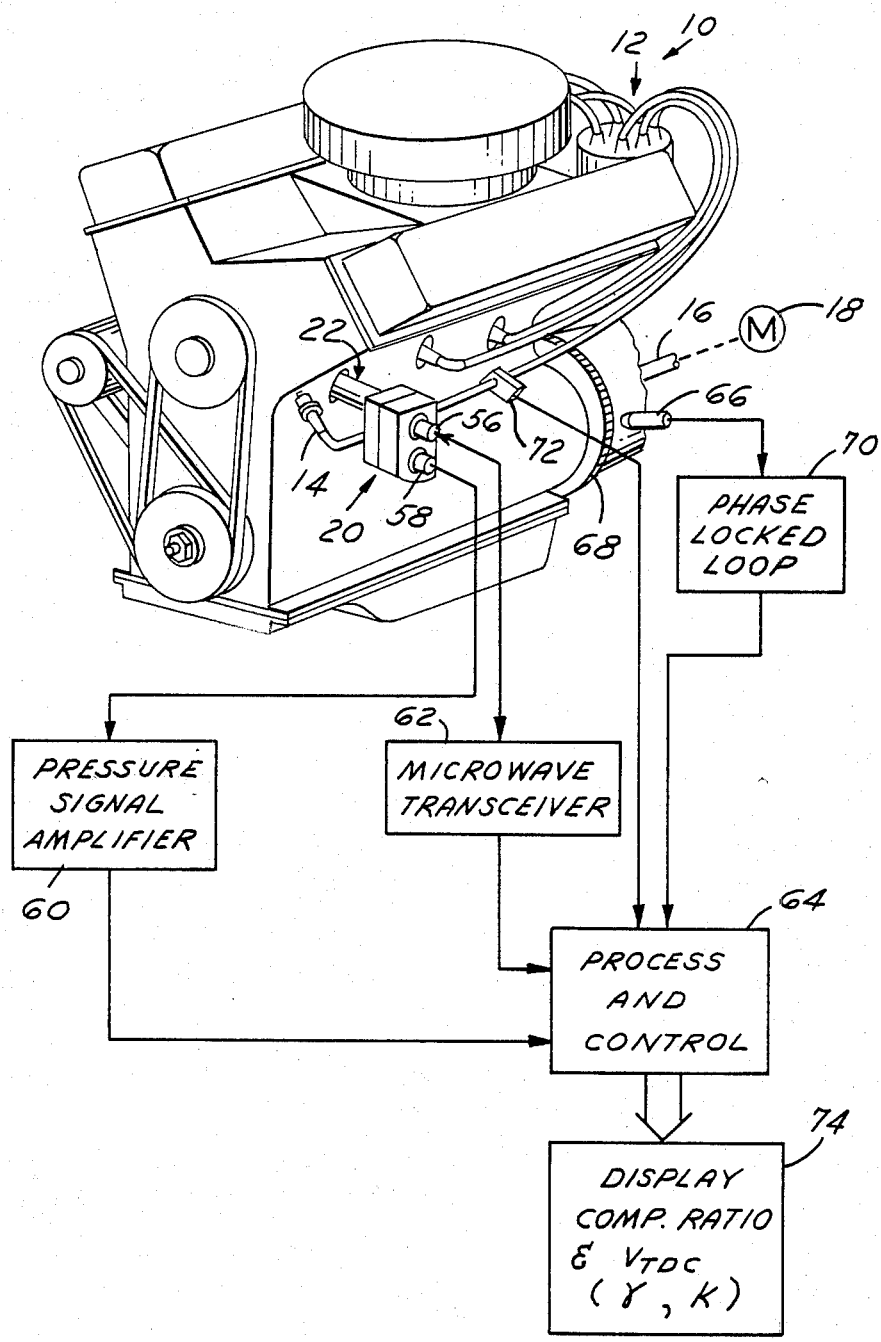

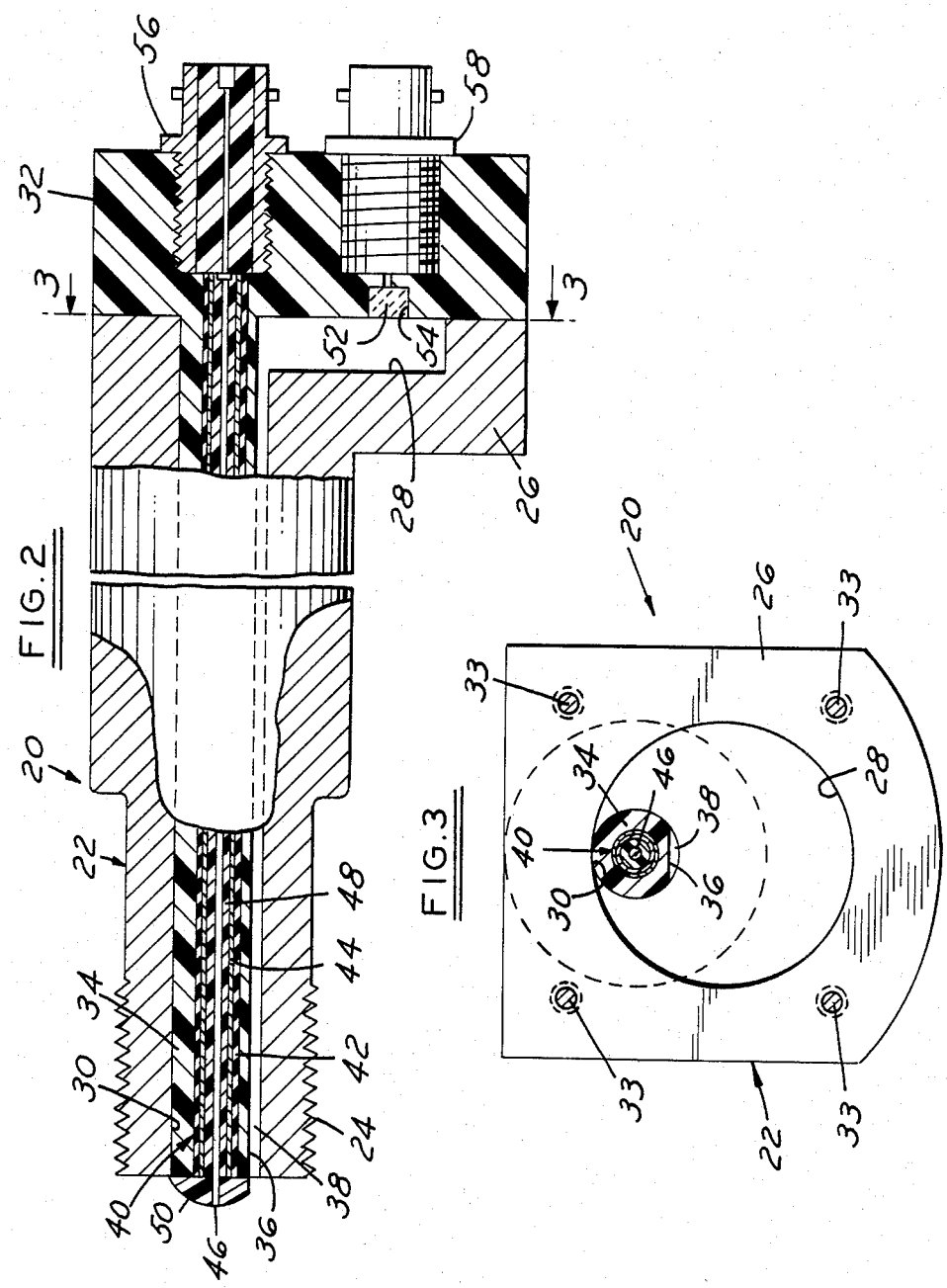

METHOD AND APPARATUS FOR MEASURING ENGINE COMPRESSION RATIO

The present invention is directed to measuring and testing of internal combustion engine parameters, and more particularly to a method and apparatus for measuring clearance volume at piston top dead center and/or cylinder compression ratio in an internal combustion engine.

BACKGROUND OF THE INVENTION

Engine compression ratio in an internal combustion engine has long been recognized as an important control parameter for obtaining optimum and consistent engine performance. Knowledge and control of compression ratio is important, for example, in controlling engine "knock", in controlling exhaust emissions and in achieving desired mileage performance. Hence, the ability accurately to determine compression ratio during the manufacturing process is of increasing interest and importance.

Engine compression ratio may be expressed by the fraction $(V_{DP}+V_{TDC})/V_{TDC}$, where $V_{DP}$ is total displacement volume of the piston within the cylinder and $V_{TDC}$ is cylinder clearance volume or head space at piston top dead center (TDC). Even if the intake valve closes after piston bottom dead center, the above definition is often used for analytical purposes. Piston displacement volume or $V_{DP}$ may be accurately obtained or determined from the mechanical design parameters and tolerances of engine component manufacture. However, clearance volume at TDC cannot be so obtained with desired accuracy, and the art has yet to propose a method for accurately measuring $V_{TDC}$ in an assembled engine with the necessary and desired accuracy.

OBJECTS AND SUMMARY OF THE INVENTION

A general object of the present invention, therefore, is to provide a method for accurately measuring compression ratio within the cylinder of an internal combustion engine, and to provide an apparatus for performing such method.

Another and more specific object of the invention is to provide a method and apparatus for accurately measuring clearance volume within the cylinder of an assembled engine.

A further object of the invention is to provide a method and apparatus for rapidly measuring cylinder compression ratio and/or clearance volume in real time with sufficient speed and accuracy to accommodate use on a mass production engine assembly line, and which avoids any need for interpretation by an operator.

Yet another object of the invention is to provide a method and apparatus for measuring cylinder compression ratio and/or clearance volume which may be used on either gasoline or diesel engines.

Briefly stated, the method and apparatus of the present invention employ the known relationship between cylinder pressure and volume expressed by the polytropic equation:

$$PV^\gamma = k \quad (1)$$

where P is pressure, V is volume, and $\gamma$ and k are constants for a given cylinder for given ambient conditions. The method of the invention contemplates accurate location of piston TDC position in units of crankshaft angle of rotation and measurement of cylinder pressure P at a number of piston positions, including the TDC position, which are spaced from each other in terms of crankshaft angle by known increments. Piston displacement volume between successive rotation increments may be accurately predetermined from engine design parameters, as previously indicated. The constants $\gamma$ and k for the test cylinder are then accurately and rapidly determined in real time from the several pressure measurements and predetermined incremental displacement volumes by mathematical solution of multiple equations for multiple unknowns or by employing an iterative graphic analysis. Clearance volume $V_{TDC}$ is then determined from equation (1) using measured pressure at TDC, and compression ratio is determined using the known total piston displacement volume $V_{DP}$.

BRIEF DESCRIPTION OF THE DRAWINGS

The invention, together with additional objects, features and advantages thereof, will be best understood from the following description, the appended claims and the accompanying drawings in which:

FIG. 1 is a functional block diagram of a presently preferred embodiment of the apparatus in accordance with the invention coupled to an internal combustion engine;

FIG. 2 is an elevational fragmentary partially sectioned view on an enlarged scale as compared with FIG. 1 of a microwave/pressure probe in accordance with the invention;

FIG. 3 is a sectional view taken along the line 3—3 in FIG. 2;

DETAILED DESCRIPTION OF PREFERRED EMBODIMENTS

Figure 4:
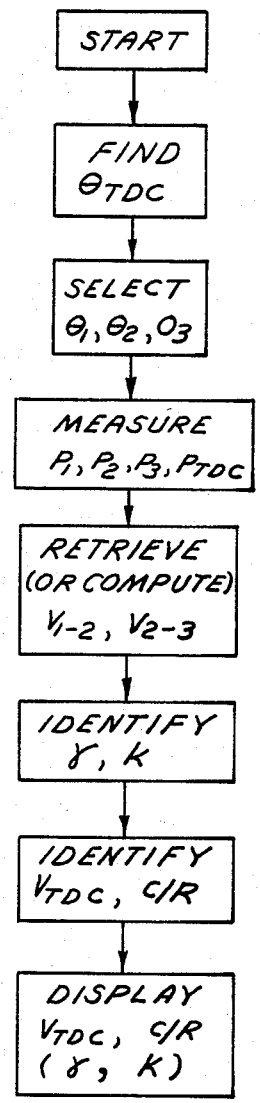
FIG. 4 is a flow chart illustrating operation of the invention.

The preferred embodiments of the method and apparatus of the present invention employ techniques and principles which are disclosed in detail in the U.S. Pat. No. 4,331,029. to Scott E. Wilson. This patent is assigned to the assignee hereof, and the entirety thereof is incorporated herein by reference.

FIG. 1 illustrates a conventional V-6 gasoline internal combustion engine 10 which includes a distributor 12 coupled to a plurality of spark plugs 14. For measuring clearance volume and compression ratio in accordance with a preferred embodiment of the invention, engine 10 is mounted on a "cold test" stand (not shown) and has its crankshaft 16 coupled to a motor 18 so that the engine may be cycled without actual fuel ignition. One of the spark plugs 14 is removed from the cylinder block and a microwave/pressure probe 20 in accordance with the invention is threaded into the engine cylinder bore in place thereof.

Referring to FIGS. 2 and 3, probe 20 includes an outer metal sleeve 22 threaded at one end 24 so as to be adapted for reception into the vacated spark plug opening. A lip 26 radiates from the opposing end of sleeve 24 and has a circular recess 28 formed in the axial face thereof tangentially contiguous with and overlapping the central bore 30 of sleeve 22. A block 32 of insulating material such as plastic is mounted by the screws 33 on sleeve 22 overlying lip 26. Block 32 has an integral sleeve 34 telescopically received and extending through axial bore 30. The radially facing edge of sleeve 34 adjacent to lip 26 is flattened as at 36 in FIG. 3 so as to cooperate with the opposing wall of bore 30 to form a part-cylindrical axial slot 38. Slot 38 extends from the tip of sleeve 22 at end 24 to recess 28 and is of sufficient cross sectional area to transmit pressure variations accurately.

A length of coaxial cable 40 is snugly received within the central bore of sleeve 34. Cable 40 includes an outer insulation sheath 42 surrounding an outer conductor 44. A central or inner conductor 46 extends through cable 40 and is separated from outer conductor 44 by the insulation layer 48. Insulation layers 42,48 and outer conductor 44 terminate in assembly flush with the coplanar ends of sleeves 32,34 while the coax cable conductor 46 protrudes or extends therefrom. A protective cap 50 of Teflon or the like covers the tip of conductor 46 but does not cover the end of slot 38. A pressure transducer 52 such as a piezoelectric crystal is mounted within a pocket 54 in block 32 in open communication with recess 28. A pair of coax connectors 56,58 are mounted on block 32 and are respectively connected to coax cable 40 and pressure transducer 52. Thus, with probe 20 received into the cylinder block in place of a spark plug 14 (FIG. 1), pressure transducer 52 communicates with the cylinder interior through pocket 54, recess 28 and slot 38 to provide at connector 58 an electrical signal indicative of pressure variations within the test cylinder as the piston reciprocates therein.

Returning to FIG. 1, connector 58 on probe 20 is connected through a suitable pressure signal amplifier 60 to the process and control electronics 64. Likewise, probe connector 56 is connected through the microwave transceiver electronics 62 to process and control electronics 64. To monitor or track rotation of crankshaft 16, a magnetic pick-up 66 is positioned adjacent the starting ring gear 68 which is coupled to the engine crankshaft. Pick-up 66 is connected to a phase locked loop 70 to provide a periodic series of pulsed signals to electronics 64 at predetermined increments of crankshaft rotation, such as on the order of every 0.1°. A suitable phase locked loop 70 is illustrated in FIG. 8 of the referenced Wilson patent. The referenced patent also discloses an optical transducer which may be removably coupled to the engine crankshaft to monitor crankshaft rotation in place of pick-up 66. Process and control electronics 64, which may comprise a suitably programmed conventional microprocessor, receives an input from an inductive pick-up 72 operatively coupled to the cable of the spark plug 14 replaced by probe 20. This input is used to distinguish the compression/power stroke of the associated piston from the exhaust/intake stroke. Process and control electronics 64 also includes conventional analog-to-digital conversion and sample-and-hold circuitry responsive to amplifier 60 and transceiver 62. Process and control electronics 64 provide an output to a suitable display device 74 for providing a numerical display of compression ratio C/R and clearance volume $V_{TDC}$, and of the cylinder constants $\gamma$ and k if desired.

Operation of the invention will be described in greater detail in connection with the flow diagram of FIG. 4 and the graphic illustrations of FIGS. 5 and 6. More specifically, FIG. 5 includes a first graph 80 which illustrates the relationship of cylinder volume V to crankshaft angle $\theta$ in the region around TDC, and a second graph 82 which illustrates the relationship of cylinder pressure P to crankshaft angle $\theta$ in the same region. It will be noted that cylinder volume V describes a symmetrical curve about a minimum clearance volume $V_{TDC}$ at the crankshaft angle $\theta_{TDC}$ associated with the piston top dead center position. Cylinder pressure P is likewise illustrated as a symmetrical curve about a peak at $\theta_{TDC}$, although for some engines it is believed that the dynamics of gas behavior in a motored engine may place maximum cylinder pressure slightly ahead of the piston top dead center angle. Operation of the invention is not affected by location of peak pressure. Also, these curves may have a slight, predictable asymmetry due to engine design parameters such as wrist pin offset. The illustrations of FIG. 5, which are not to scale, cover an angular range during the compression/power stroke of the piston in which all valves are closed. It is presently preferred to perform the method of the invention while the engine is cold motored by an external source 18 because changes in cylinder pressure (with all valves closed) may be related directly to changes in volume due to piston motion, as will be described.

With the spark plug 14 removed and the probe 20 inserted in place thereof, the engine is cold motored by the motor 18 and microwave signals are injected by transceiver electronics 62 and probe 20 into the cylinder volume or bore. As the piston reciprocates within the cylinder, the microwave signals exhibit a plurality of resonance peaks which are generally symmetrical around piston TDC. Process and control electronics is responsive to the microwave resonance signals directed thereto by transceiver electronics 62, and to the crankshaft rotation signals obtained from phase locked loop 70, for accurately identifying the crankshaft angle associated with piston TDC, i.e. $\theta_{TDC}$. The process for locating $\theta_{TDC}$ is described in greater detail in the referenced Wilson patent, and reference is made thereto for a more detailed description of the preferred method for locating piston TDC in practice of the present invention. Although microwave-range radiation is specifically disclosed in Wilson and is presently preferred, it is envisioned that radiation in other frequency ranges, such as X-rays or ultrasonics, may be used in appropriate circumstances while applying the Wilson technique for identifying $\theta_{TDC}$ from the radiation resonances.

As a next step, three angles $\theta_1$, $\theta_2$ and $\theta_3$ are selected at spaced intervals with respect to $\theta_{TDC}$. In the illustration of FIG. 5, angles $\theta_1$, $\theta_2$, $\theta_3$ and $\theta_{TDC}$ are at equally spaced intervals during the piston compression stroke. Cylinder pressure as indicated by probe 20 and pressure signal amplifier 60 is then measured at each angle $\theta_1$, $\theta_2$, $\theta_3$ and $\theta_{TDC}$ to obtain corresponding pressure signals $P_1$, $P_2$, $P_3$ and $P_{TDC}$ which are stored in memory. It is presently considered preferable, although not necessary, to measure pressure on several successive compression strokes, and to utilize average pressures for further computations. As previously indicated, the changes in cylinder volume during the intervals between the selected angles $\theta_1$, $\theta_2$ and $\theta_3$ may be accurately determined as a function of engine mechanical design parameters. These incremental displacement volumes $V_{1-2}$ and $V_{2-3}$ may be either precalculated for predetermined values of $\theta_1$, $\theta_2$ and $\theta_3$ and stored in memory for later retrieval, or may be rapidly calculated in real time within process and control electronics 64 from design parameter operator inputs (not shown).

The constants $\gamma$ and k for the specific cylinder under test and the volume $V_1$ at crankshaft angle $\theta_1$ are then identified. Two techniques for finding $\gamma$, k and $V_1$ are presently preferred.

In the first technique, initial volume $V_1$ and the constants $\gamma$ and k are obtained by solution of the following three equations for at least two ($\gamma$ and k) and preferably three unknowns:

$$P_1 V_1^\gamma = k \tag{2}$$

$$P_2(V_1 - V_{1\text{-}2})^\gamma = k \tag{3}$$

$$P_3(V_1 - V_{1\text{-}2} - V_{2\text{-}3})^\gamma = k \tag{4}$$

These equations are readily solved using conventional microprocessor techniques for $V_1$, $\gamma$ and k from measured pressures $P_1$, $P_2$ and $P_3$ and from incremental displacement volumes $V_{1\text{-}2}$ and $V_{2\text{-}3}$ determined on the basis of engine design parameters.

Alternatively, and in accordance with the second technique, the constant $\gamma$ and the volume $V_1$ are found using an iterative "graphic" technique. First, equations (2)–(4) above are rearranged as follows:

$$\frac{P_1}{P_2} = \left[ \frac{V_1 - V_{1\text{-}2}}{V_1} \right]^\gamma \tag{5}$$

$$\frac{P_1}{P_3} = \left[ \frac{V_1 - V_{1\text{-}2} - V_{2\text{-}3}}{V_1} \right]^\gamma \tag{6}$$

$$\frac{P_2}{P_3} = \left[ \frac{V_1 - V_{1\text{-}2} - V_{2\text{-}3}}{V_1 - V_{1\text{-}2}} \right]^\gamma \tag{7}$$

Knowing the approximate or nominal value of $V_1$ (and $\gamma$) from the mechanical design, progressively varying values of $V_1$ (or $\gamma$) around nominal are substituted into equations (5)–(7), again using the measured pressures $P_1$, $P_2$, $P_3$ and the computed or precomputed incremental displacement volumes $V_{1\text{-}2}$ and $V_{2\text{-}3}$.

Figure 6:
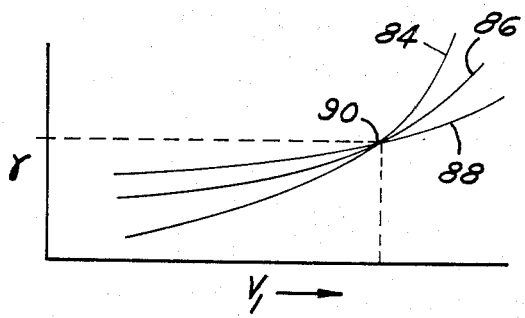

Solutions of these three equations for $\gamma$ for various values of $V_1$ (or for $V_1$ for various values of $\gamma$) yield the three curves 84,86 and 88 illustrated in FIG. 6. These three curves intersect at a point 90 which corresponds to the actual volume $V_1$ and the actual constant $\gamma$ associated with the test cylinder. With $\gamma$, $P_1$ and $V_1$ in hand, the constant k is given by the equation:

$$k = P_1 V_1^\gamma \tag{8}$$

It will be appreciated that the iterative "graphic" technique may be readily performed using conventional microprocessor techniques without resorting to a manual "graphic" solution. Likewise, the point 90 of intersection may be found using only two of the three equations (5), (6) and (7). However, the use of three equations is preferred for enhanced accuracy over the full range of tolerances in engine design and the reliability tolerances of cylinder pressure measurement. That is, it may be expected under actual operating conditions that the three lines 84,86,88 do not intersect at a single point. Use of a third graph line helps to identify an "average" intersection point 90 with greater accuracy.

Returning to FIG. 4, with the constants k and $\gamma$ identified and the pressure $P_{TDC}$ at piston top dead center measured per the above, the clearance volume $V_{TDC}$ at piston top dead center may be obtained per the equation:

$$V_{TDC} = \left[ \frac{k}{P_{TDC}} \right]^{\frac{1}{\gamma}} \tag{9}$$

Compression ratio C/R may then be obtained per the equation:

$$C/R = \frac{V_{TDC} + V_{DP}}{V_{TDC}} \tag{10}$$

As a final step in the process of FIG. 4, clearance volume $V_{TDC}$ and compression ratio C/R may be displayed to the test system operator. Likewise, in analytical or research applications for example, other parameters such as $\gamma$ and k for the engine and cylinder under test may be displayed if desired.

Figure 5:
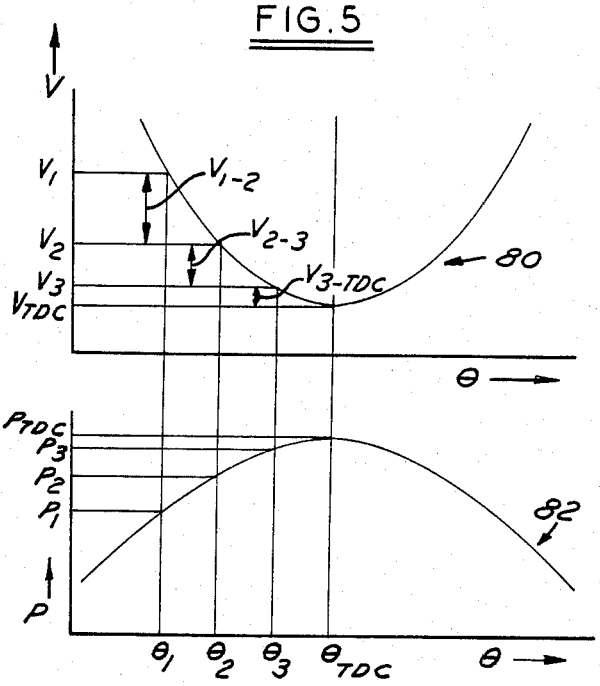
FIGS. 5 and 6 are graphic illustrations useful in understanding operation of the invention.

One potentially useful modification to the embodiments and techniques of the invention hereinabove discussed involves substitution of $V_{TDC}$ for $V_1$ as the arbitrarily selected starting volume, which would eliminate both the extra computation step of equation (9) and the necessity of measuring pressure $P_1$ at angle $\theta_1$. Thus, equations (2)–(4) may take the form:

$$P_{TDC} V_{TDC}^\gamma = k \tag{11}$$

$$P_3(V_{TDC} + V_{3\text{-}TDC})^\gamma = k \tag{12}$$

$$P_2(V_{TDC} + V_{3\text{-}TDC} + V_{2\text{-}3})^\gamma = k \tag{13}$$

where $P_2$, $P_3$ and $P_{TDC}$ are (average) pressures measured at $\theta_2$, $\theta_3$ and $\theta_{TDC}$ in FIG. 5, and $V_{3\text{-}TDC}$ and $V_{2\text{-}3}$ are incremental displacement volumes calculated or precalculated as previously described. Note that these equations may be directly solved for $V_{TDC}$, as well as for $\gamma$ and k. The iterative "graphic" technique of equations (5)–(7) and FIG. 6 may likewise be modified by substituting $V_{TDC}$ for $V_1$.

Another modification of potential interest involves measurement of total displacement volume $V_{DP}$ rather than, or in addition to, calculation or precalculation thereof as previously described. In this modification, assuming that all valves are closed at piston bottom dead center, total displacement volume is measured as a function of the equation:

$$V_{DP} = V_{BDC} - V_{TDC} \tag{14}$$

where $V_{BDC}$ is cylinder volume at piston bottom dead center. To obtain $V_{BDC}$, the crankshaft angle associated with piston BDC is first obtained. In theory, this angle, $\theta_{BDC}$, is equal to $\theta_{TDC} + 180°$. In actual practice, however, factors such as wrist pin offset, etc. are such that $\theta_{BDC}$ is slightly displaced from $\theta_{TDC} + 180°$. This displacement can be calculated from engine design parameters. When $\theta_{BDC}$ has been identified, a corresponding (average) $P_{BDC}$ is obtained, and $V_{BDC}$ is determined from the equation:

$$V_{BDC} = \left[ \frac{k}{P_{BDC}} \right]^{\frac{1}{\gamma}} \tag{15}$$

Compression ratio may then be obtained as:

$$C/R = \frac{V_{TDC} + V_{DP}}{V_{TDC}} = \frac{V_{TDC} + (V_{BDC} - V_{TDC})}{V_{TDC}} \quad (16)$$

$$= \frac{V_{BDC}}{V_{TDC}}$$

Comparison of the compression ratio measurement made as described above with a measurement obtained as previously described may be used to detect engine faults or compression ratio measurement error caused, for example, by unsealed piston rings.

It is also possible, within the scope of the invention, to instrument two different cylinders for microwave and pressure measurement, or indeed to instrument all cylinders for pressure but only one cylinder for microwave where compression ratio and/or clearance volume are to be measured at all cylinders, for example. In these cases, $\theta_{TDC}$ for each cylinder would be determined by adding an appropriate angular increment to the $\theta_{TDC}$ measured for the microwave-instrumented cylinder.

Thus, the method of the invention contemplates identification of crankangle $\theta_{TDC}$ at piston top dead center. Most preferably, this is accomplished using the microwave techniques disclosed in the referenced Wilson patent. $P_a, P_b, P_c$ are measured at predetermined angles $\theta_a, \theta_b$ and $\theta_c$ incrementally spaced from $\theta_{TDC}$. Cylinder pressure $P_{TDC}$ is then measured at the TDC crankangle $\theta_{TDC}$. (One of the positions $\theta_a, \theta_b$ or $\theta_c$ may be $\theta_{TDC}$.) Most preferably, these incremental angles are equal, and the pressure measurements are taken when all valves are closed during the piston compression stroke. Incremental displacement volumes $V_{a-b}$ and $V_{b-c}$ are calculated or, more preferably, precalculated for the type of engine under test from nominal engine design parameters.

With the pressure readings $P_a, P_b, P_c$ and the displacement volumes $V_{a-b}, V_{a-b}$ in hand, equation (1) may be expressed in the form of three equations, which may then be solved for the two unknown constants $\gamma$ and $k$, and also for the initial "reference" volume $V_a$, which may be $V_{TDC}$. Where $V_a$ is not $V_{TDC}$, and knowing $\gamma$ and $k$ for the cylinder under test, clearance volume $V_{TDC}$ may be determined using equation (1) and $P_{TDC}$. A second technique for identifying the unknowns $\gamma$, $k$ and $V_a$ is an iterative "graphic" solution of two dimensions to locate the point of "graphic" intersection. This point of intersection corresponds to the actual solution, and yields the desired unknowns. Most preferably, either technique is employed in real time using a suitably programmed conventional digital microprocessor.

Thus, one aspect of the method of the invention contemplates measurement of clearance volume $V_{TDC}$ as previously described. Another aspect of the method contemplates determination of compression ratio (C/R) for the cylinder under test as a function of the fraction $(V_{TDC} + V_{DP})/V_{TDC}$ where $V_{DP}$ is total piston displacement volume. Total displacement volume is obtained either as a calculated or precalculated function of engine design parameters, or by measuring the volume $V_{BDC}$ at piston bottom dead center if all valves are closed, in accordance with equation (15).

The invention also contemplates apparatus for determining cylinder clearance volume and/or compression ratio in accordance with the foregoing method, including in particular a dual microwave/pressure probe adapted to communicate with the cylinder bore.

The invention claimed is:

1. A method of measuring compression ratio in an internal combustion engine cylinder having a piston disposed to reciprocate within said cylinder and a crankshaft rotatably coupled to said piston, said method comprising the steps of:
   (a) monitoring rotation of said crankshaft,
   (b) identifying an angular position of said crankshaft corresponding to top dead center position of said piston within said cylinder,
   (c) monitoring pressure within said cylinder while said crankshaft is rotating and said piston is reciprocating within said cylinder,
   (d) determining clearance volume within said cylinder at said top dead center position as a function of monitored pressure within said cylinder and monitored rotation of said crankshaft,
   (e) determining total piston displacement volume within said cylinder, and
   (f) identifying the compression ratio for said cylinder as a function of a difference between said clearance and displacement volumes.

2. The method set forth in claim 1 wherein said step (c) includes the step of measuring cylinder pressure $P_{TDC}$ at said angular position identified in said step (b), and wherein said step (d) comprises the step of determining clearance volume $V_{TDC}$ as a function of the equation:

$$V_{TDC} = \left[\frac{k}{P_{TDC}}\right]^{\frac{1}{\gamma}}$$

where $k$ and $\gamma$ are constants for said cylinder.

3. The method set forth in claim 2 comprising the additional steps of (g) determining said constants $\gamma$ and $k$ by:
   (g1) measuring cylinder pressure $P_a, P_b, P_c$ at three spaced angular positions of said crankshaft,
   (g2) determining piston displacement volumes $V_{a-b}, V_{b-c}$ within said cylinder between successive ones of said three spaced angular positions of said crankshaft, and
   (g3) determining said constants $\gamma$ and $k$ as a function of the equations:

$$P_a V_a^\gamma = k$$

$$P_b (V_a + V_{a-b})^\gamma = k$$

$$P_c (V_a + V_{a-b} + V_{b-c})^\gamma = k$$

4. The method set forth in claim 3 wherein one of said spaced angular positions is said TDC position identified in said step (b).

5. The method set forth in claim 3 wherein said step (f) comprises the step of identifying compression ratio C/R as a function of the equation $$C/R = \frac{V_{TDC} + V_{DP}}{V_{TDC}}$$

where $V_{DP}$ is said total displacement volume determined in said step (e).

6. The method set forth in claim 5 wherein said displacement volumes $V_{a-b}, V_{b-c}$ and $V_{DP}$ are determined in said steps (g2) and (e) as a function of engine design parameters.

7. A method of measuring clearance volume wherein a cylinder having a piston disposed to reciprocate therein and a shaft coupled to said piston, said method comprising the steps of:
  (a) rotating said shaft while monitoring angular rotation of said shaft,
  (b) identifying top dead center position of said piston within said cylinder,
  (c) identifying a first angular position of said shaft corresponding to said top dead center position of said piston,
  (d) monitoring variations in pressure within said cylinder as said shaft is rotating and said piston is reciprocating within said cylinder,
  (e) identifying a first pressure within said cylinder at said first angular position of said shaft corresponding to said top dead center position and at least a second pressure within said cylinder at a second angular position of said shaft separated from said first position by a predetermined shaft angle,
  (f) determining piston displacement volume within said cylinder between said first and second shaft angles, and
  (g) determining clearance volume within said cylinder as a combined function of said displacement volume and said first and second pressures.

8. A method of measuring clearance volume $V_{TDC}$ within the cylinder of an internal combustion engine having a piston disposed to reciprocate within said cylinder and a crankshaft coupled to said piston, said method comprising the steps of:
  (a) identifying a first angular position $\theta_{TDC}$ of said crankshaft corresponding to top dead center of said piston within said cylinder,
  (b) measuring pressure $P_{TDC}$ within said cylinder at said top dead center position of said piston, and
  (c) determining said clearance volume as a function of the equation:

$$V_{TDC} = \left[ \frac{k}{P_{TDC}} \right]^{\frac{1}{\gamma}}$$

where k and $\gamma$ are constants for a given cylinder.

9. The method set forth in claim 8 comprising the additional steps prior to said step (c) of:
  (d) measuring cylinder pressure $P_a, P_b, P_c$ at angularly spaced positions $\theta_a, \theta_b, \theta_c$ of said crankshaft,
  (e) identifying volumes $V_{a-b}$ and $V_{b-c}$ of piston displacement between said crankshaft positions $\theta_a, \theta_b$ and $\theta_b, \theta_c$ respectively, and
  (f) determining said constants $\gamma$ and k as respective functions of the equations:

$$P_a V_a^\gamma = k$$

$$P_b (V_a + V_{a-b})^\gamma = k$$

$$P_c (V_a + V_{a-b} + V_{b-c})^\gamma = k.$$

10. The method set forth in claim 9 wherein said steps (a), (b) and (d) are carried out during the compression/power stroke of said piston within said cylinder.

11. The method set forth in claim 8 or 9 comprising the additional step of determining compression ratio C/R within said cylinder as a function of the equation:

$$C/R = \frac{V_{TDC} + V_{DP}}{V_{TDC}}$$

where $V_{DP}$ is total displacement volume of said piston within said cylinder.

12. Apparatus for measuring clearance volume in a cylinder having a piston disposed to reciprocate therein and a shaft rotatably coupled to said piston, said apparatus comprising:
  means adapted to be rotatably coupled to said shaft for monitoring angular rotation of said shaft,
  means for identifying a first angular position of said shaft corresponding to TDC position of said piston within said cylinder,
  means for measuring pressure within said cylinder at a plurality of second angular positions spaced from each other,
  means for determining displacement volumes of said piston between said plurality of second angular positions, and
  means for determining clearance volume within said cylinder at said first angular position of said shaft as a function of pressure measurements at second angular positions and said displacement volumes between said second angular positions.

13. The apparatus set forth in claim 12 wherein said means for identifying said first angular position comprises means for injecting radiation into said cylinder, means for detecting resonances of said radiation as said piston reciprocates within said cylinder and means for determining TDC position of said piston from said resonances.

14. The apparatus set forth in claim 12 or 13 further comprising means for identifying a compression/power stroke of said piston within said cylinder and for enabling operation of said apparatus only during a said compression/power stroke.

15. A method of measuring clearance volume in an internal combustion engine cylinder having a piston disposed to reciprocate within said cylinder and a crankshaft rotatably coupled to said piston, said method comprising the steps of:
  (a) monitoring rotation of said crankshaft,
  (b) identifying an angular position of said crankshaft corresponding to top dead center position of said piston within said cylinder,
  (c) monitoring pressure within said cylinder while said crankshaft is rotating and said piston is reciprocating within said cylinder, and
  (d) determining clearance volume within said cylinder at said top dead center position as a function of monitored pressure within said cylinder and monitored rotation of said crankshaft.

16. The method set forth in claim 1, 15 or 8 comprising the additional step of cold motoring said engine from a source external to said engine.

17. The method set forth in claim 16 wherein all of said pressures are measured during a single piston compression stroke.

18. In an internal combustion engine having a cylinder, a piston disposed to reciprocate within said cylinder and a crankshaft rotatably coupled to said piston, cylinder pressure and volume being related by the equation $PV^\gamma = k$ wherein P is pressure, V is volume, and $\gamma$ and k are constants, a method of measuring at least one of the constants $\gamma$ and k comprising the steps of:

(a) monitoring angular rotation of said crankshaft,
(b) measuring pressure $P_a, P_b, P_c$ within said cylinder at angularly spaced positions $\theta_a, \theta_b, \theta_c$ of said crankshaft while said crankshaft is rotating and said piston is reciprocating within said cylinder,
(c) identifying volumes $V_{a\text{-}b}$ and $V_{b\text{-}c}$ of piston displacement within said cylinder between said crankshaft positions $\theta_a, \theta_b$ and $\theta_b, \theta_c$ respectively, and
(d) determining at least one of said constants $\gamma$ and $k$ as a function of the equations:

$$P_a V_a^\gamma = k$$

$$P_b(V_a + V_{a\text{-}b})^\gamma = k$$

$$P_c(V_a + V_{a\text{-}b} + V_{b\text{-}c})^\gamma = k.$$

19. The method set forth in claim 18 wherein said steps (a) through (c) are carried out during the compression/power stroke of said piston within said cylinder.